Figure 1:
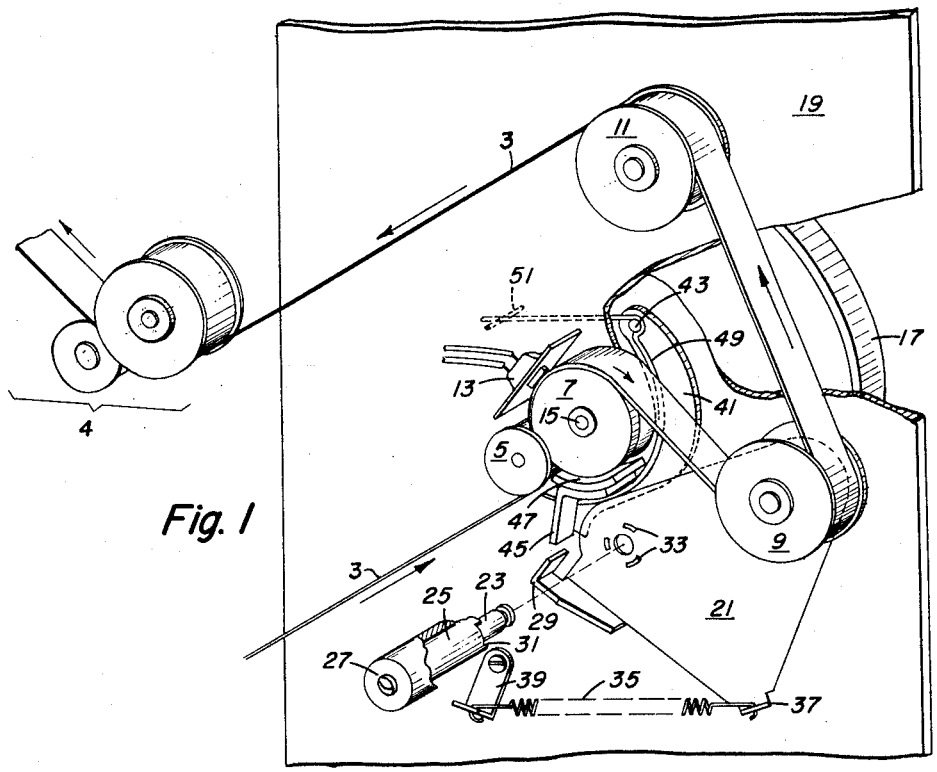

June 16, 1964     W. A. MARTIN     3,137,427

BRAKE MECHANISM FOR RECORDING APPARATUS

Filed April 30, 1962

WILLIAM A. MARTIN
INVENTOR.

BY *R. Frank Smith*
*Robert W. Hampton*

ATTORNEYS

United States Patent Office 3,137,427
Patented June 16, 1964

3,137,427
BRAKE MECHANISM FOR RECORDING
APPARATUS
William A. Martin, Rochester, N.Y., assignor to Eastman
Kodak Company, Rochester, N.Y., a corporation of
New Jersey
Filed Apr. 30, 1962, Ser. No. 191,239
7 Claims. (Cl. 226—13)

This invention relates to sound recording apparatus and, more particularly, to a brake mechanism for controlling the movement of the sound film in motion picture cameras and projectors.

In systems in which sound is recorded on and played back from a web, such as film, it is essential that the speed of the film be stabilized as it passes the transducing head. To assure uniform speed of the film at the transducing position, that position usually is located on the curved surface of a sound drum over which the film is passed, the sound drum being rotated with the film and its speed of rotation being stabilized by means of a flywheel. One of the major problems involved in such sound recording systems is the stabilization of the speed of the film over the sound drum each time the film drive is started. The basic cause of this problem is the inertia of the flywheel, which, while acting to stabilize the sound drum once the latter is up to speed, is difficult to overcome when the system is first started and when it is stopped.

While there are various well-known and satisfactory methods for starting the flywheel and bringing it up to speed independently of the sound drum, e.g., by utilizing such means as friction clutches, present methods for overcoming the effect of the inertia of the flywheel on the sound drum when the system is stopped are relatively unsatisfactory. Due to flywheel inertia many existing recording systems permit too great a time lapse between the stopping of the film mechanism and the stopping of the sound drum, resulting in a troublesome loss of tension in the film between the sound drum and the drive mechanism. This loss of tension introduces what shall be referred to as "free loop" in the film. Such free loop is undesirable in that, among other things, it increases the time needed to stabilize the system when the film drive is started once again. Prior art methods of eliminating the free loop are relatively complex and expensive, requiring such elements as heavy brake members acting directly on the flywheel and solenoids operated in conjunction with the film drive motor, and they often subject the film to an unsatisfactory amount of strain.

The present invention prevents the build-up of free loop and minimizes the time needed to stabilize the system on re-starting. This is accomplished by means of a mechanically simple and relatively inexpensive mechanism which applies a braking force directly to the sound drum, this braking force being applied proportional to the tension on the film between the sound drum and the drive mechanism. The brake is released when the film is being driven, and it is applied when the film drive is stopped. The braking mechanism is controlled by a movable guide roller which responds to the tension present in that portion of the film between the sound drum and the drive mechanism, moving in one direction in response to the tension normally present when the film is being driven at a rate equal to or greater than the rate at which it is passing over the second drum, and moving in the opposite direction in response to the reduction in film tension occurring when the rate at which the film is passing over the sound drum exceeds the rate at which it is being driven. In this manner, when the film drive mechanism is stopped, the sound drum is braked and the film passing over it is stopped in response to the small amount of free loop that builds up in the film between the sound drum to the drive mechanism within a few frames of film movement following the stopping of the film drive mechanism. The flywheel, which is connected to the sound drum shaft by means of a friction clutch, is permitted to continue rotating until its inertia is expended. Since the sound drum is braked independently, the inertia of the flywheel does not cause the build-up of excessive free loop nor does it place any strain on the film. In addition, the action of the movable film guide is such that it maintains constant tension on the film, absorbing the small amount of free loop which is built up in the film between the sound drum and the film drive during the short interval between the stopping of the film drive and the braking of the sound drum. Thus, the movable film guide, which causes the brake to be applied to the sound drum while it maintains tension on the film, permits the film to be quickly stopped without shock or unusual strain and eliminates excessive stabilization time when the film drive is started once again.

It is an object of this invention to provide a new and improved mechanism for controlling the web on which sound is recorded in sound recording systems.

Another object of this invention is to control the web, such as film, used in a sound recording system to prevent the building up of excessive free loop in the film between the sound drum and the film drive mechanism when the recording apparatus is stopped, thereby minimizing the time required to stabilize the system when the film drive is started once again.

A further object of this invention is to provide a more economical and simpler means for stopping the web passing over a sound drum in recording apparatus whenever the drive mechanism is stopped.

A still further object is to provide means for providing a brake which acts directly on the sound drum of recording apparatus whenever the drive mechanism of the apparatus is stopped.

And yet another object is to provide a self-energizing brake which acts directly on the sound drum of recording apparatus and which is operated in accordance with the tension on that portion of the web passing between the sound drum and the drive mechanism.

Figure 3A:
Figure 3B:
Figure 2:
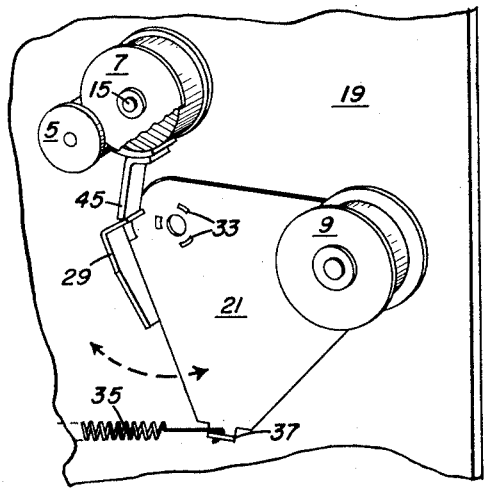

Other objects and novel features of this invention will be more fully understood from the following description, reference being made to the accompanying drawings in which:

FIGURE 1 is an isometric view of a portion of a sound recording unit used in conjunction with a movie camera and constructed in accordance with the invention, showing the relationship of parts when film is being driven;

FIGURE 2 is a view similar to FIG. 1, with certain members omitted, showing the relationship of parts when the film drive is stopped and the film drum is braked; and FIGURES 3A and 3B are schematic representations of a sound drum and a brake lever arm, FIGURE 3A illustrating one possible relationship between these members, and FIGURE 3B illustrating the relationship utilized in the preferred embodiment of the invention as shown in FIGURE 1.

While the invention herein is applicable to any sound recording system utilizing a rotatable sound drum in conjunction with a transducing head for purposes of recording or playing back sound on or from a movable web, the following description is limited to one embodiment of the invention, namely, as part of a unit used to record sound on the magnetic stripe carried on motion picture film.

Referring now to FIGURE 1, a sound recording unit for a movie camera is shown with certain parts cut away, others exploded, and all parts unnecessary to the description of the invention herein being omitted. In FIGURE 1 it is assumed that the film 3 is being driven by drive rollers 4 in the direction of the small solid arrows, film 3 being threaded under pressure roller 5, over sound drum 7, and around movable guide roller 9 and stationary guide roller 11. The sound is recorded on the magnetic stripe carried on the edge of film 3 as it passes between the surfaces of sound drum 7 and recording head 13.

Sound drum 7 is rigidly connected to the shaft 15. Flywheel 17, which is viewed through a cutaway portion of mounting plate 19, is connected to shaft 15 by means of a friction clutch. The friction clutch is not shown and may be any one of the numerous types of friction clutches well known in the art.

Movable guide roller 9 is attached to film guide lever arm 21, a triangular plate, which is rotatably mounted on mounting plate 19 by means of pin 23. Rotational motion of film guide lever arm 21 is damped by virtue of the interaction of inner cylinder 25 and outer cylinder 27, which are concentrically mounted on pin 23. Inner cylinder 25 rotates with and is rigidly fixed to film guide lever arm 21 by means of projecting tips 31 co-operating with recesses 33 in the surface of film guide lever arm 21. Outer cylinder 27 is rigidly attached to pin 23 and remains in fixed relation to mounting plate 19. Since inner cylinder 25 rotates with film guide lever arm 21 while outer cylinder 27 remains rigidly connected to mounting plate 19, a silicone grease packed between these cylinders tends to slow their rotation with respect to each other and acts to dampen the rotational motion of film guide lever arm 21.

Film guide lever arm 21 is normally biased by a spring 35, one end of which passes through a hole in flange 37 formed at the lower corner of film guide lever arm 21, the other end of spring 35 being secured to tension adjustment arm 39.

A brake lever arm 41 is rotatably attached to mounting plate 19 by means of pin 43. At the end of brake lever arm 41, a suitably shaped flange 45 holds brake shoe 47 which is designed to cooperate with the curved surface of sound drum 7. A spring 49, which is passed around pin 43 and has one end secured by pin 51, acts against flange 45 of brake lever arm 41 to normally bias brake shoe 47 away from sound drum 7.

It should be noted that the sound drum braking means just explained above is designed to be self-energizing when brake shoe 47 contacts the curved surface of sound drum 7 in the manner illustrated in FIG. 2. Various self-energizing relationships between the brake lever arm and the sound drum are possible, and one such possible relationship is illustrated in FIG. 3A in which sound drum 7 is schematically represented as being braked by brake shoe 53 mounted on lever arm 55. Lever arm 55 is pivoted at point $x$, and point $t$ is the point of tangency with the curved surface of sound drum 7 of a tangent $xt$ taken from point $x$, while point $p$ is the intercept of the perpendicular drawn from point $x$ to the curved surface of sound drum 7. As long as brake shoe 53 contacts the curved surface of sound drum 7 within the sector $pt$, the clockwise motion of sound drum 7 tends to force brake shoe 53 in closer relation to the curved surface of sound drum 7. In other words, so long as brake shoe 53 acts on sound drum 7 in the sector $pt$, the relationship is self-energizing. However, in the relationship utilized in the preferred embodiment of the invention, as illustrated schematically in FIG. 3B, lever arm 41 is pivoted at point X. Points P and T are, respectively, the points of intercept with the curved surface of sound drum 7 of perpendicular and tangent lines drawn from point X. While this relationship is also self-energizing so long as brake shoe 47 contacts the curved surface of sound drum 7 within sector PT, it should be noted that self-energizing sector PT is considerably larger than the sector $pt$ illustrated in FIG. 3A and just discussed above. Since the self-energizing sector is larger in the relationship utilized in the preferred embodiment of the invention, the positioning of brake shoe 47 is less critical and permits greater latitude for purposes of design and manufacturing tolerances.

The preferred embodiment, illustrated in 3B, has a further advantage over an embodiment such as that illustrated in 3A in that brake lever arm 41 can be provided with a more efficient spring release. This becomes apparent when consideration is given to the forces acting on the respective brake lever arms. Assuming that the respective brake shoe and sound drum members are driven into self-energizing relation under similar conditions, the forces exerted on the respective brake shoes are equal. However, referring first to FIG. 3A, the effect on brake lever arm 55 of the force exerted on brake shoe 53 by this braking action is equivalent to an equal force acting perpendicular to brake lever arm 55 at point $f$, while (in FIG. 3B) the effect on brake lever arm 41 of the force exerted on brake shoe 47 is equivalent to an equal force acting perpendicular to brake lever arm 41 at point F. Assuming that release springs acting on the respective lever arms at points $s$ and S, respectively, are set for maximum effect (i.e., at the greatest practical distance from pivotal points $x$ and X), the superiority of the mechanical advantage of a spring acting on brake lever arm 41 at point S to overcome the force exerted at point F, over a similar spring acting on brake lever arm 55 at point $s$ to overcome the force at point $f$, is obvious.

Further explanation of the invention herein will now be made from the standpoint of its operation. As was explained above, FIG. 1 illustrates the position of the various parts shown therein at the time when film 3 is being driven in the direction of the small solid arrows and sound is being recorded on the magnetic stripe on the edge of film 3 by recording head 13 as the film passes over sound drum 7. The tension on spring 35 is adjusted to be slightly less than the tension normally exerted on film 3 when it is being driven at a rate equal to or greater than the rate at which it is passing over sound drum 7. This causes film guide lever arm 21 to be rotated to the position illustrated in FIG. 1, namely, with brake contacting flange 29 rotated away from and out of contact with flange 45 of brake lever arm 41.

Under these conditions, the force of spring 49, acting against flange 45, is sufficient to hold brake lever arm 41 and its brake shoe 47 away from the surface of sound drum 7, which rotates with the driven film 3. The angular velocity of sound drum 7 is stabilized by fly wheel 17 which is initially brought up to speed by a conventional gear train (not shown). Although occasional minor variations on the tension on film 3 may cause some slight movement in film guide lever arm 21, this movement is damped by the action of cylinders 25 and 27, as explained above, and the various members remain generally in the position just described until such time as the film drive is stopped and braking action begins.

At the instant the film drive is stopped, the inertia of flywheel 17 causes sound drum 7 to continue to rotate and the tension normally exerted on film 3 begins to decrease rapidly as the film tends to build up free loop between sound drum 7 and drive rollers 4. As the tension on film 3 decreases, the tension of spring 35 causes film guide lever arm 21 to rotate in a clockwise direction. As illustrated in FIG. 2, this brings brake contacting flange 29 of film guide lever arm 21 into contact with flange 45 of brake lever arm 41, overcoming the effect of spring 49 and causing brake lever arm 41 to rotate until brake shoe 47 contacts the curved surface of sound drum 7. As soon as brake shoe 47 contacts sound drum 7, the brake is applied with the combined force exerted by spring 35 and the self-energization force of the brake mechanism as explained above.

It should also be noted that the braking force of spring 35 is not suddenly applied but increases proportional to the decrease in film tension after the film is stopped, and thus the braking of sound drum 7 does not subject film 3 to any abrupt and damaging strain. At the same time, sufficient braking force is applied to sound drum 7 to stop its motion and the movement of film 3 before any excessive free loop is built up between sound drum 7 and drive rollers 4, and since movable guide roller 9 follows film guide lever arm 21, it absorbs the small amount of free loop that has built up during the interval between the stopping of the drive rollers and the stopping of the sound drum by the braking action just described above.

It should be noted that the braking of the sound drum (with the concommitant stopping of the film passing over it) occurs independently of the operation of flywheel 17 which continues to rotate until its inertia is expended.

When drive rollers 4 are started once again, the tension on film 3 overcomes the force of spring 35 and causes film guide lever arm 21 to rotate once again to the position illustrated in FIG. 1. This disengages brake contact flange 29 from flange 45, and spring 49 rotates brake lever arm 41 in a counter clockwise direction disengaging brake shoe 47 from sound drum 7 which is once again free to rotate in response to the movement of film 3. Since no excessive free loop was permitted to build up in film 3, very little movement of film 3, in response to the re-starting of the film drive mechanism, is necessary before the brake is released and sound drum 7 is brought up to recording speed. Also, since flywheel 17 begins to move as soon as the film drive is re-started, it is soon brought up to recording speed and the entire system is stabilized within only a few frames of film movement.

The invention has been described in detail with particular reference to a preferred embodiment thereof, but it will be understood that various changes and modifications can be effected within the spirit and scope of the invention as described herein and as defined in the appended claims.

I claim:

1. In a system for recording and reproducing sound on and from a web and including a web drive for moving said web along a predetermined path and a sound drum over which said web is driven, said sound drum being stabilized by a flywheel, the improvement comprising: a friction coupling between said drum and said flywheel; a brake disposed in direct cooperative relation to said sound drum and adapted, when actuated, to apply a braking force to the said sound drum sufficient to prevent rotation thereof by force transmitted through said coupling from said flywheel; and control means responsive to the movement of said web for normally applying said brake to said drum when said web is not being driven and for releasing said braking means when said web is being driven.

2. The construction according to claim 1 wherein said web drive pulls said web over said drum.

3. The construction according to claim 2 wherein said control means includes a web guide lever arm biased to a first position, and a web guide mounted on said web guide lever arm and adapted to receive said web at a point intermediate said sound drum and said web drive and to cause said web guide lever arm to be moved away from its said first position only when said web is being driven; and wherein said brake includes a brake lever arm biased to a first position, and a brake shoe mounted on said brake lever arm and disposed in direct cooperative relation to said sound drum, said brake shoe contacting said sound drum only when said brake lever arm is moved away from its said first position; said brake lever arm being caused to move away from its said first position by the action of said web guide lever arm whenever the web is not being driven and said web guide lever arm returns to its said first position.

4. In a system for recording and reproducing sound on and from a web, including a web drive, a transducing head acting on said web at a point on the curved surface of a rotatable sound drum stabilized by a flywheel to which it is connected by a friction coupling, the improvement for braking said sound drum comprising: a web guide for receiving said web intermediate said sound drum and said web drive and movable between a first and second position, said web guide being moved toward its said first position when said web is not being driven and the tension on that portion of said web between said sound drum and said web drive is less than a predetermined amount, and said web guide being moved toward its second position when said web is being driven by said web drive and the tension on said portion of said web is greater than said predetermined amount; a brake disposed in direct cooperative relation to said sound drum and adapted, when applied to said drum, to exert thereon a braking force sufficient to prevent rotation thereof by force transmitted through said coupling from said flywheel; and brake control means responsive to the movement of said web guide for applying said brake to said sound drum when said guide is moved to its first position and for releasing said brake when said web guide is moved toward its second position, whereby said brake is applied to said sound drum when the web is not being driven and released when the web drive is restarted, the movement of said web guide from said second position to said first position absorbing the small amount of free loop built up in said web between said sound drum and said web drive during the interval between the stopping of said web drive and the braking of said sound drum.

5. The construction as defined in claim 4 wherein said brake control means includes a brake lever arm having a pivot, said brake being mounted on said brake lever arm distant from said pivot and disposed to contact the circumference of said sound drum between the point of intercept of the perpendicular from said pivot to said circumference and the point of tangency of the tangent from said pivot to said circumference, whereby when said brake is brought into contact with the circumference of said sound drum the normal rotation of said sound drum tends to drive said brake into closer relation to said sound drum thereby causing said brake to become self-energizing.

6. The construction as defined in claim 4 wherein the initial braking force applied to said sound drum by said brake is proportional to the movement of said web guide in response to the reduction of said web tension as said tension decreases from said predetermined amount.

7. The construction as defined in claim 4 wherein said brake control means includes a brake lever arm movable between a first and a second position and normally biased to said second position, said brake being mounted on said brake lever arm and disposed in cooperative relation with said sound drum to be in contact with said sound drum whenever said brake lever arm is in its said first position and to be out of contact with said sound drum whenever said brake lever arm is in its said second position; and wherein said web guide includes a web guide lever arm movable between a first and a second position and being normally biased to said first position and a web guiding element attached to said web guide lever arm for receiving said web, said web guide lever arm being disposed in cooperative relation to said brake lever arm to maintain said brake lever arm in its said first position only when said web guide lever arm is in its said first position, and said web guide lever arm being rotated to its said second position when said web is being driven over said web guiding means at a rate equal to or greater than the rate at which said web is passing over said sound drum.

References Cited in the file of this patent

UNITED STATES PATENTS

| | | |
|---|---|---|
| 2,827,285 | Thompson | Mar. 8, 1958 |
| 2,970,787 | Libby | Feb. 7, 1961 |
| 3,062,924 | Johnson | Nov. 6, 1962 |

UNITED STATES PATENT OFFICE
CERTIFICATE OF CORRECTION

Patent No. 3,137,427                        June 16, 1964

William A. Martin

It is hereby certified that error appears in the above numbered patent requiring correction and that the said Letters Patent should read as corrected below.

Column 2, line 1, for "second" read -- sound --.

Signed and sealed this 12th day of January 1965.

(SEAL)
Attest:

ERNEST W. SWIDER
Attesting Officer

EDWARD J. BRENNER
Commissioner of Patents